United States Patent [19]
Feit et al.

[11] 3,875,150
[45] Apr. 1, 1975

[54] NEW SULFAMYL-ANTHRANILIC ACIDS
[75] Inventors: Peter Werner Feit, Gentogte; Ole Bent Tvaermose Neilsen, Vanlose, both of Denmark
[73] Assignee: Lovens Kemiske Fabrik Producktionsaktieselskab, Ballerup, Denmark
[22] Filed: Feb. 28, 1973
[21] Appl. No.: 336,758

Related U.S. Application Data
[62] Division of Ser. No. 31,413, April 23, 1970, Pat. No. 3,755,383.

[30] Foreign Application Priority Data
Apr. 29, 1969 United Kingdom............. 21890/69

[52] U.S. Cl....... 260/239.6, 260/239.65, 260/239.8, 260/239.9, 260/239.95, 260/397.7 R, 260/515 M
[51] Int. Cl.............................................. C07d 5/16
[58] Field of Search....... 260/239.6, 239.8, 297.7 R, 260/239.65

[56] References Cited
UNITED STATES PATENTS

| | | | |
|---|---|---|---|
| 2,910,488 | 10/1959 | Novello...................... | 260/239.6 X |
| 3,444,177 | 5/1969 | Schmidt et al............... | 260/239.8 X |
| 3,454,562 | 7/1969 | Loev et al...................... | 260/239.6 |
| 3,565,920 | 2/1971 | Werner....................... | 260/239.6 X |
| 3,567,714 | 3/1971 | Wilson........................... | 260/239.6 |
| 3,577,409 | 5/1971 | Cragoe........................... | 260/239.6 |
| 3,658,990 | 4/1972 | Werner............................ | 424/228 |
| 3,755,383 | 8/1973 | Feit et al......................... | 260/397.7 |

OTHER PUBLICATIONS

Chemical Abstracts, Vol. 74, abstract no. 22558 t (1971) (abstract of Germ. Offen. 2,021,105).

Feit et al., J. Med. Chem., Vol. 15, pages 79 to 83 (1972).

*Primary Examiner*—John D. Randolph
*Attorney, Agent, or Firm*—Harold L. Stowell

[57] ABSTRACT

This invention relates to new 4-substituted 5-sulfamyl-anthranilic acids, and salts and esters thereof, having a pronounced diuretic and saluretic effect; to methods of producing the said compounds; and to pharmaceutical compositions in dosage unit from containing the said compounds as active ingredients.

4 Claims, No Drawings

NEW SULFAMYL-ANTHRANILIC ACIDS

This is a division application Ser. No. 31,413, filed Apr. 23, 1970 now U.S. Pat. No. 3,755,383 issued Aug. 28, 1973.

This invention relates to a series of new compounds, to salts and esters of these compounds, and to methods for the production of the compounds.

The new compounds have the general formula I

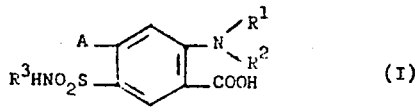

in which A is an $R^4$-O-, $R^4$-S-, $R^4$-OS, or $R^4O_2S$-radical, $R^1$, $R^2$, $R^3$, and $R^4$ each represent an aliphatic radical, a cycloaliphatic radical, or an aromatically, cycloaliphatically or heterocyclically substituted aliphatic radical provided that when one or both of $R^1$ and $R^2$ are hydrogen or an aliphatic radical, A is different from an aliphatic $R^4O$ group; $R^3$ and $R^4$ may each also be an aromatic or heterocyclic radical; in addition $R^3$ may be an acyl radical, or an unsubstituted or substituted carbamyl radical. Each of $R^1$, $R^2$, and $R^3$ may also be a hydrogen atom.

In particular, each of $R^1$, $R^2$, $R^3$, and $R^4$ may represent a straight or branched chain saturated or unsaturated alkyl radical, e.g. a methyl, ethyl, propyl, isopropyl, butyl, isobutyl, or tert.-butyl radical, one of the different isomeric pentyl, hexyl, and heptyl radicals, an alkenyl or alkynyl radical, e.g. a vinyl, allyl, or propargyl radical, a cycloalkyl or cycloalkenyl radical, e.g. a cyclopropyl, cyclobutyl, cyclopentyl, cyclohexyl, cycloheptyl, or cyclooctyl radical, one of the different isomeric cyclopentenyl and cyclohexenyl radicals, or an adamantyl radical. The aliphatic radicals may further contain hetero atoms, e.g., oxygen, sulphur, or nitrogen, which may interrupt the carbon chain and may further be substituted, e.g., with lower alkyl radicals. In the aromatically, cycloaliphatically or heterocyclically substituted aliphatic radicals, the aromatic part of the radical can be a mono- or bicyclic aryl radical, e.g., a phenyl or naphthyl radical, the cycloaliphatic part of the radical can be the cycloalkyl or cycloalkenyl radicals mentioned above, the heterocyclic part of the radical can be a mono- or bicyclic radical containing one or more oxygen, sulphur, and nitrogen atoms as ring members, e.g., 2-, 3-, or 4-pyridyl, 2- or 3-furyl, or thienyl, thiazolyl, imidazolyl, benzimidazolyl, and the corresponding hydrogenated ring-systems, and the aliphatic part of the radicals can contain 1 to 4 carbon atoms. As illustrative examples of such aromatically and heterocyclically substituted aliphatic radicals can be mentioned benzyl, 1- and 2-phenylethyl, 1- and 2-naphthyl-methyl, furyl-methyl, thienyl-methyl, and the corresponding ethyl, propyl, and butyl radicals. When such aromatically or heterocyclically substituted aliphatic radicals are present at the nitrogen atom, and A represents an aliphatic $R^4O$ group, especially valuable products are obtained when $R^4$ is a $C_{4-7}$ alkyl group. When $R^3$ and $R^4$ represent aromatic or heterocyclic radicals, these can be the mono- or bicyclic radicals already mentioned above.

All the above mentioned radicals can be substituted in different positions with different groups, such as one or more halogen atoms, e.g., chlorine or bromine atoms, alkyl, halo-alkyl, e.g., trifluoromethyl, carboxy, carbalkoxy or carbamyl radicals, di-lower alkylamino radicals, hydroxy groups, which may be etherified or esterified, or etherified mercapto groups.

The salts of the compounds of the invention are pharmaceutically acceptable salts, e.g. alkali metal salts, alkaline earth metal salts, ammonium salts, or amine salts formed, for instance, from mono-, di-, or trialkylamines, or mono-, di-, or trialkanolamines or cyclic amines. The esters of the compounds are preferably derived from lower aliphatic alcohols and benzylalcohols.

The compounds of the invention possess valuable therapeutic properties and have, according to animal experiments performed in connection with the present invention, a particularly strong effect as diuretics and saluretics, the ratio between the excretion of sodium ions and potassium ions being very favourable. Furthermore, the compounds are not carboanhydrase inhibitors, and these facts in connection with a favourable therapeutic index make the present compounds particularly valuable.

For instance, the diuretic effect has been compared to that of the well-known diuretic Furosemide, belonging to the group of chlorosulfamylanthranilic acids.

The diuretic and saluretic activity of 4-phenoxy-5-sulfamyl-N-(furyl-2-methyl)-anthranilic acid, in the table below called OT 1190, was primarily determined in animal experiments in which the test animals, dogs, after a control period of 2 hours were given by intravenous injection a dose of 0.1 mg/kg of the substance in the form of its sodium salt which compared to an injection of 4 mg/kg of Furosemide gave almost the same excretions as will be seen from the table below. Besides the volume of urine excreted within three hours, the amounts of milli-equivalents of $Na^+$ and $Cl^-$ excreted were also determined.

TABLE I

| Compound | mg/kg | ml of urine | $Na^+$ | $Cl^-$ |
|---|---|---|---|---|
| Controls (average) | | 2 | 0.2 | 0.13 |
| OT 1190 | 0.1 | 27 | 2.9 | 3.8 |
| Furosemide | 4.0 | 26 | 2.4 | 3.1 |

Another object of the invention resides in the selection of a dose of one of the compounds of the invention, or their salts or esters, which can be administered so that the desired activity is achieved without simultaneous secondary effects. In such a dosage unit, the compound is conveniently administered as a pharmaceutical composition containing from 0.1 mg to 100 mg of the active compound. The compounds of formula I, in which $R^1$ and $R^3$ are hydrogen, $R^2$ is either benzyl, furylmethyl, thienylmethyl, or lower alkyl having from 3 to 6 carbon atoms, A is $R^4O$ or $R^4S$, and $R^4$ is phenyl, are particularly active and are preferably administered in amounts from 0.5 mg to 25 mg. By the term "dosage unit" is meant a unitary, i.e., a single dose capable of being administered to a patient, and which may be readily handled and packed, remaining as a physically stable unit dose, comprising either the active material as such or a mixture of it with a pharmaceutical carrier and auxiliary agents.

In the form of a dosage unit, the compound may be administered one or more times a day with appropriate intervals, always depending, however, on the condition of the patient.

In the pharmaceutical compositions, the proportion of therapeutically active material to carrier substances can vary between 0.5 percent and 90 percent by weight.

The composition can either be made up in pharmaceutical forms of presentation, such as tablets, pills, dragees, and suppositories, or the composition can be filled in medical containers, such as capsules or ampoules, or, as far as mixtures are concerned, filled in bottles or tubes and similar containers.

Pharmaceutical organic or inorganic, solid or liquid carriers suitable for oral, enteral, and parenteral administration can be used to make up the compositions. Water, gelatine, lactose, starch, magnesium stearate, talc, vegetable and animal oils and fats, benzyl alcohol, gums, polyalkylene glycol, petroleum jelly, cocoa, butter, lanolin, and other known carriers for medicaments are all suitable as carriers, while stabilizing agents, wetting or emulsifying agents, salts for varying osmotic pressure, and buffers for securing an adequate pH-value of the composition can be used as auxiliary agents.

Thus for compositions in the form of tablets or the like, or in injectable compositions, the sodium salt or the potassium salt may be used, as it is sufficiently water-soluble. For injectable compositions, however, salts with certain organic bases may advantageously be employed due to their high degree of solubility in water.

The free acid may be administered in capsules, or in tablets, of which the latter may be effervescent-tablets in order to obtain fast absorption, or they may be sustained-release tablets in order to obtain a prolonged effect which may be desirable in the treatment of hypertension. If the composition is to be injected, a sealed ampoule, a vial or a similar container may be provided, containing a parenterally acceptable aqueous or oily injectable solution or dispersion of the active material.

The compositions may further contain other therapeutically active components suitable in the treatment of hypertension and oedematous conditions, such as a hypotensor, e.g., hydralazin, methyldopa, reserpin, rescinnamine, or protoveratrine, or other Rauwolfia- or Veratrum alkaloids, and/or a tranquilizer, such as 2:2-di(carbamoyloxymethyl)-pentane (meprobamate), and/or other diuretics and saluretics, such as the well-known benzothiadiazines, e.g., hydroflumethiazide or bendroflumethiazide. Potassium-sparing compounds, e.g., triamterene or 1-(3,5-diamino-6-chloropyrazinecarboxyl)-guianidine or related compounds, may also be used in the preparation of the compositions.

For some purposes it may be desirable to add small amounts of carboanhydrase inhibitors or aldosterone antagonists, e.g., spironolactone.

The pharmaceutical compositions in dosage unit forms are useful in the treatment of oedematous conditions, e.g., cardiac, hepatic, renal, lung, or brain oedema, or oedamatous conditions during pregnancy, and of pathological conditions which produce an abnormal retention of the electrolytes of the body, as well as in the treatment of hypertension and congestive heart failure.

The compounds of the invention may be prepared by various methods, for example according to the following reaction scheme:

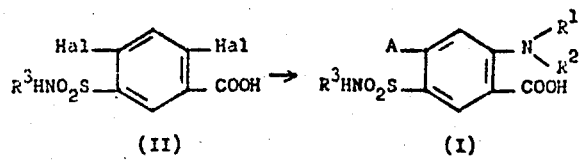

wherein the substituents A, $R^1$, $R^2$, and $R^3$ are as defined before, and Hal stands for the same or different halogen atoms, preferably chlorine and fluorine.

The conversion of the compounds of formula II into the compounds of the invention may be effected in two steps, whereby the two halogen atoms are replaced by the groups

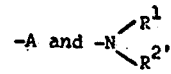

respectively. The activating influence of the sulfamyl and carboxylic acid group on the halogen atoms, and the choice of a particular pair of halogen atoms will determine which of the two halogen atoms will first be replaced whereby two intermediates of the formulae IIIa and IIIb may be obtained:

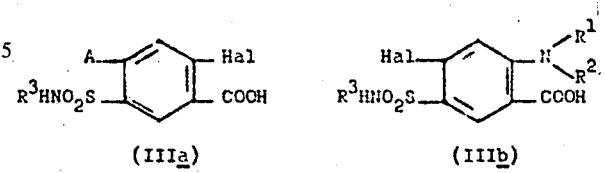

The starting compounds of formula II are known compounds or, if new, they can be prepared by the same methods as the known ones by chlorosulfonation of a 2,4-dihalo-benzoic aicd, in which the two halogen atoms can be different or the same, advantageously by using an excess of chlorosulfonic acid. The resulting sulfochloride is then reacted with an amine, $R^3$-$NH_2$. This amination is preferably performed below or at room temperature and with or without solvents, depending on the amine used in the reaction. The amine is preferably used in an amount of at least two equivalents, in order to bind the hydrogen halide formed by the process. Other basic agents for binding the hydrogen halide can be used as well.

In the starting compounds so obtained, the two halogen atoms may be the same, in which case the halogen in the 2-position, i.e., in the ortho-position to the carboxylic group, will be more reactive than that in the 4-position, whereby a reaction with an amine of the formula

results in the well-known compounds of the general formula IIIb, the reaction conditions in this case being known from the literature.

When the halogen atoms are different, the preferred intermediates are those in which the reactivity of the halogen atom in the 4-position is more pronounced than that in the 2-position. Particularly useful are the compounds of formula II, in which the halogen atom in the 2-position is chlorine and in the 4-position is fluorine. The reaction of a compound of this type with a compound of the formula A-H, A being -O-$R^4$, -S-$R^4$, or -$O_2$S-$R^4$, results in the compounds of the general formula IIIa. The reaction can be performed by heating the two components, if convenient, in the presence of an organic or inorganic base and, if desired, in the presence of water or a suitable organic solvent, or mixtures thereof. The isolation of the reaction products can be performed by well-known standard procedures.

The reaction between the compound IIIa and an amine $HN-R^1R^2$ is effected by heating the components, if necessary in the presence of an inert organic solvent, using preferably an excess of two or more equivalents of the amine. The temperature depends on the amine used in the process, and will in most cases preferably be about the boiling point of the amine or the solvent used.

The reaction between the compounds IIIb and the compounds A-H can be performed under reaction conditions similar to those described for the preparation of the compound IIIa.

In the case where $R^1$ and $R^2$ in formula IIIb are both hydrogen, the intermediate IIIb can be obtained in known manner from the well-known 2-acetamino-4-halogenotoluene, which by chlorosulfonation followed by an amination can be transformed into the analogous 2-acetamino-4-halogeno-5-$R^3$-sulfamyl-toluene, which can then be oxidized to the corresponding anthranilic acid derivative by treatment with potassium permanganate. By an acidic or alkaline hydrolysis, IIIb ($R^1=R^2=H$) can be obtained. When Hal stands for chlorine, the resulting compounds are known, and in the same way the corresponding fluoro derivatives can be obtained from the known 4-fluoro-2-acetaminotoluene. Particularly when Hal stands for fluorine in formula IIIb, both the free and the acylated anthranilic acid derivatives react under mild conditions with compounds A-H to form the compounds of the invention in which $R^1=R^2=H$. These compounds can be alkylated to other compounds of formula I using standard procedures, and some of the latter can be subjected to a dealkylation resulting in compounds of the invention in which $R^1=R^2=H$.

In the case where A stands for a radical of the sulfinyl or sulfonyl series, the compounds of the invention are preferably prepared from the corresponding mercapto derivatives by oxidation with, for instance, hydrogen peroxide. Depending upon the amount of hydrogen peroxide and the reaction conditions, the oxidation results in the sulfinyl or the sulfonyl derivatives.

The isolation of the reaction products can be carried out in known manner. If the products are obtained as salts or esters, they can, if desired, be converted into the free acids in known manner. The compounds of formula I in which $R^3$ is an acyl or a carbamyl group can be obtained preferably from the corresponding compounds in which $R^3$ is hydrogen by reacting them under alkaline conditions with an acid or a reactive derivative thereof, or with an isocyanate, respectively.

Some of the starting materials are new and are prepared in the following manner:

2,4-Difluoro-5-sulfamyl-benzoic acid 2,4-Difluorobenzoic acid (17.5 g) is added in portions to chlorosulfonic acid (70 ml) at room temperature while stirring. The mixture is then stirred at 155°–160°C for 2 hours, cooled and carefully added to ice (about 300 g). The precipitated 5-chlorosulfonyl-2,4-difluorobenzoic acid is collected by filtration and washed with cold water. The crude sulfochloride is added in portions to concentrated ammonium hydroxide (160 ml) while stirring at 10°–12°C. After the addition has been completed, the stirring is continued at room temperature for a further 20 hours. The solution is carefully acidified with concentrated hydrochloric acid, and the resulting precipitate is collected by filtration and washed with water. After drying, 2,4-difluoro-5-sulfamyl-benzoic acid is obtained with a melting point of 203°–204°C. Recrystallization from aqueous ethanol raises the melting point to 203.5°–204°–5°C.

Ethyl 2-Chloro-4-fluoro-5-sulfamyl-benzoate

A solution of 2-chloro-4-fluoro-5-sulfamyl-benzoic acid (25 g) in ethanol (500 ml) is saturated with hydrogen chloride and left overnight. The solution is evaporated in vacuo, and the residue is triturated with saturated sodium hydrogen carbonate solution (about 250 ml). The undissolved material is collected by filtration and washed with water. After drying, ethyl 2-chloro-4-fluoro-5-sulfamyl-benzoate is obtained with a melting point of 135°–137°C. After recrystallization from 50 per cent ethanol, the melting point is unchanged.

Methyl 2-Chloro-4-fluoro-5-sulfamyl-benzoate

By replacing ethanol by methanol in the above procedure, methyl 2-chloro-4-fluoro-5-sulfamyl-benzoate is obtained with a melting point of 173°–175°C.

Ethyl 2,4-Difluoro-5-sulfamyl-benzoate

By replacing the 2-chloro-4-fluoro-5-sulfamylbenzoic acid of the above procedure by 2,4-difluoro-5-sulfamylbenzoic acid, ethyl 2,4-difluoro-5-sulfamyl-benzoate is obtained with a melting point of 133°–135°C.

4-Fluoro-5-sulfamyl-anthranilic acid a. 2-Acetamino-4-fluoro-5-sulfamyl-toluene

A mixture of 2-acetamino-4-fluoro-toluene (20 g), sodium chloride (8.0 g), and chlorosulfonic acid (50 ml) is heated on a steam bath for 2 hours. The mixture is then poured onto ice (about 300 g), and the precipitated sulfochloride is filtered off and washed with water. The partially dried sulfochloride is added in small portions to anhydrous ammonia (about 100 ml), while stirring, and the mixture is left overnight. Cold water (100 ml) is added, and the precipitate is filtered off and washed with water. After drying, 2-acetamino-4-fluoro-5-sulfamyltoluene is obtained with a melting point of 206°–208°C. Recrystallization from ethanol raises the melting point to 211°–212°C.

b. 4-Fluoro-5-sulfamyl-N-acetyl-anthranilic acid

To a suspension of 2-acetamino-4-fluoro-5-sulfamyltoluene (12.0 g) in 10 percent aqueous magnesium sulfate solution (200 ml), potassium permanganate (36.0 g) is added in portions within 30 minutes at 90°–95°C, while stirring vigorously. The mixture is then stirred at this temperature for a further 2 hours. Excess potassium permanganate is destroyed by addition of aqueous sodium hydrogen sulfite. The precipitated manganese dioxide is filtered off and washed with hot water (50 ml). The combined filtrates are acidified with concentrated hydrochloric acid (20 ml), and the resulting precipitate is filtered off and washed with water. After drying, 4-fluoro-5-sulfamyl-N-acetyl anthranilic acid is obtained with a melting point of 247°–249°C (dec.). Recrystallization from ethanol raises the melting point to 257°–258°C (dec.).

c. 4-Fluoro-5-sulfamyl-anthranilic acid

A solution of 4-fluoro-5-sulfamyl-N-acetyl-anthranilic acid (0.8 g) in 4N sodium hydroxide (5 ml) is heated on a steam bath for 2 hours. After cooling, the solution is acidified with acetic acid (2.5 ml), and the resulting precipitate is filtered off and washed with water. After drying, 4-fluoro-5-sulfamyl-anthranilic acid with a melting point of 261°–262°C is obtained.

The invention will now be illustrated by the following non-limiting Examples.

EXAMPLE 1

4-Phenoxy-5-sulfamyl-N-benzyl-anthranilic acid a. 2-Chloro-4-phenoxy-5-sulfamyl-benzoic acid A mixture of 2-chloro-4-fluoro-5-sulfamyl-benzoic acid (12 g), phenol (50 g), and potassium hydroxide (12.5 g) is heated to 150°–160°C for 3 hours while stirring. The mixture is diluted with water, extracted twice with diethyl ether and carefully acidified with concentrated hydrochloric acid (15 ml). The precipitated oil is crystallized from water and filtered off. After drying, 2-chloro-4-phenoxy-5-sulfamyl-benzoic acid is obtained with a melting point of 195°–198°C (dec.). Recrystallization from aqueous ethanol raises the melting point to 206.5°–207.5°C.

b. 4-Phenoxy-5-sulfamyl-N-benzyl-anthranilic acid

A mixture of 2-chloro-4-phenoxy-5-sulfamyl-benzoic acid (10 g) and benzylamine (40 ml) is heated to 130°–135°C for 4 hours. The mixture is poured into cold 4N acetic acid (200 ml), and the resulting precipitate is filtered off and washed with water, cold ethanol, and diethyl ether. After drying, 4-phenoxy-5-sulfamyl-N-benzyl-anthranilic acid is obtained with a melting point of 239°–240°C (dec.) Recrystallization from ethanol raises the melting point to 241.5°–243°C (dec.).

EXAMPLES 2 – 11

By following the procedure described in Example 1 b, but replacing the benzylamine by the amines of the following table II, the corresponding 4-phenoxy-5-sulfamyl-N-substituted-anthranilic acids are obtained:

TABLE II

| Ex. No. | Amines | N-substituent | M.P. °C |
|---|---|---|---|
| 2 | 3-dimethylamino-propylamine-1 | N-(3-dimethylamino-propyl) | 268–269 (dec.) |
| 3 | 3-aminopropanol-1 | N-(3-hydroxypropyl) | 191–192 |
| 4 | 3-methoxypropyl-amine-1 | N-(3-methoxypropyl) | 189–190 |
| 5 | 3-phenylpropyl-amine-1 | N-(3-phenylpropyl) | 221–222 (dec.) |
| 6 | 2-chlorobenzylamine | N-(2-chlorobenzyl) | 258.5–259 (dec.) |
| 7 | 4-methoxybenzylamine | N-(4-methoxybenzyl) | 195–195.5 (dec.) |
| 8 | 3-methylbenzylamine | N-(3-methylbenzyl) | 237–238 (dec.) |
| 9 | 3,4-dimethoxybenzyl-amine | N-(3,4-dimethoxy-benzyl) | 191–191.5 (dec.) |
| 10 | piperidine | N,N-pentamethylene | 214.5–215.5 (dec.) |

EXAMPLE 12

4-Phenoxy-5-sulfamyl-N-allyl-anthranilic acid

A mixture of 2-chloro-4-phenoxy-5-sulfamyl-benzoic acid (5.0 g) and allylamine (50 ml) is refluxed for 90 hours and thereafter evaporated in vacuo. The residue is triturated with a mixture of 4N acetic acid (35 ml) and concentrated hydrochloric acid (5 ml). The resulting crystalline material is collected by filtration and washed with water. The material is extracted with hot saturated sodium hydrogen carbonate solution (25 ml) and filtered hot in the presence of decolourizing carbon. The clear filtrate is carefully acidified with concentrated hydrochloric acid (4 ml). The resulting precipitate is collected by filtration and washed with water. After drying and crystallizing twice from ethanol, 4-phenoxy-5-sulfamyl-N-allyl-anthranilic acid is obtained with a melting point of 229°–230°C (dec.).

EXAMPLE 13

4-Phenoxy-5-sulfamyl-N-n-butyl-anthranilic acid

A mixture of 2-chloro-4-phenoxy-5-sulfamyl benzoic acid (2 g), n-butylamine (15 ml), and water (5 ml) is refluxed for about 72 hours. The mixture is evaporated in vacuo, and the residue is crystallized with 4N acetic acid (20 ml), filtered off, and washed with water. After drying and recrystallizing twice from aqueous ethanol, 4-phenoxy-5-sulfamyl-N-n-butyl-anthranilic acid is obtained with a melting point of 217°–219°C (dec.).

EXAMPLES 14 – 15

By following the procedure described in Example 13, but replacing the n-butylamine by isobutylamine and n-pentylamine and extending the reaction time to 96 hours and 110 hours, respectively, the 4-phenoxy-5-sulfamyl-N-isobutyl-anthranilic acid with a melting point of 220°–221°C (dec.) and 4-phenoxy-5-sulfamyl-N-n-pentylanthranilic acid with a melting point of 227°–228°C (dec.) are obtained.

EXAMPLE 16

4-Phenoxy-5-sulfamyl-N-[furyl-(2)-methyl]-anthranilic acid

A mixture of 2-chloro-4-phenoxy-5-sulfamyl-benzoic acid (2.5 g) and furfurylamine (7.5 ml) is stirred at 125°C for 3 hours. The mixture is then cooled and poured into cold 4N acetic acid (30 ml). The resulting semisolid material is washed with water and then extracted with hot saturated sodium hydrogen carbonate solution (25 ml) and filtered hot in the presence of decolourizing carbon. The clear filtrate is acidified with acetic acid (5 ml). The resulting precipitate is washed with water. After drying and recystallization, 4-phenoxy-5-sulfamyl-N-[furyl-(2)-methyl]-anthranilic acid is obtained with a melting point of 229°–230°C (dec.).

EXAMPLE 17

4-Phenoxy-5-sulfamyl-N-[thienyl-(2)-methyl]-anthranilic acid

By following the procedure of Example 16, but replacing the furfurylamine by 2-thienylamine, 4-phenoxy-5-sulfamyl-N-[thienyl-(2)-methyl]-anthranilic acid with a melting point of 222°C (dec.) is obtained.

EXAMPLE 18

4-Phenoxy-5-sulfamyl-N-(α-naphthylmethyl)-anthranilic acid

A solution of 4-phenoxy-5-sulfamyl-anthranilic acid (1.54 g) and α-chloromethylnaphthalene (2.0 g) in ethanol (25 ml) is refluxed for 65 hours, and thereafter evaporated in vacuo. The oily residue is triturated with water which is decanted and replaced by 75 percent ethanol (15 ml). On standing for 2 days at 5°C, the oil crystallizes. The crystalline material is collected by filtration and washed with cold 50 percent ethanol; it is dissolved in 2N sodium hydroxide (15 ml) and heated on a steam bath for 1 hour. The solution is filtered hot in the presence of decolourizing carbon and is then acidified with concentrated hydrochloric acid (4 ml). The resulting precipitate is collected by filtration and washed with water. After drying and recrystallizing from a mixture of ethanol and methyl-cellosolve, 4-phenoxy-5-sulfamyl-N-(α-naphthylmethyl)-anthranilic acid with a melting point of 232°–233°C (dec.) is obtained.

EXAMPLE 19

4-Phenoxy-5-sulfamyl-N,N-di-n-butyl-anthranilic acid

A solution of 2-chloro-4-phenoxy-5-sulfamyl-benzoic acid (2.0 g) and di-n-butylamine (8.0 ml) in methylcellosolve (10 ml) is stirred at 135°C for 40 hours, and is then evaporated in vacuo. The residue is triturated with 4N acetic acid (10 ml), and the resulting crystalline material is collected by filtration and washed with water. The product is extracted with hot saturated sodium hydrogen carbonate solution (30 ml) and filtered hot in the presence of decolourizing carbon. The filtrate is acidified with acetic acid (10 ml). The resulting precipitate is collected by filtration and washed with water. After drying and crystallizing twice from 50 percent ethanol, 4-phenoxy-5-sulfamyl-N,N-di-n-butyl-anthranilic acid with a melting point of 172°–173°C is obtained.

EXAMPLE 20

4-Phenoxy-5-sulfamyl-N,N-dibenzyl-anthranilic acid a. 4-Fluoro-5-sulfamyl-N,N-dibenzyl-anthranilic acid A mixture is 2,4-difluoro-5-sulfamyl-benzoic acid (3.0 g), dibenzylamine (10 ml), and water (10 ml) is heated on a steam bath for 2.5 hours. The mixture is poured into 4N acetic acid (40 ml) and left standing overnight. The precipitated semi-solid material is triturated with ethanol (25 ml). The resulting crystalline material is collected by filtration and washed with ethanol and with diethyl ether. After drying, 4-fluoro-5-sulfamyl-N,N-dibenzyl-anthranilic acid is obtained with a melting point of 215°C (dec.). After recrystallization from ethanol, the melting point is unchanged.

b. 4-Phenoxy-5-sulfamyl-N,N-dibenzyl-anthranilic acid

A mixture of 4-fluoro-5-sulfamyl-N,N-dibenzyl-anthranilic acid (1.5 g), phenol (10 g), and potassium hydroxide is stirred at 160°C for 5 hours. The mixture is cooled, diluted with water (25 ml), and acidified to pH 5 with concentrated hydrochloric acid. The precipitated oil is washed with water and triturated with ethanol (5 ml). The resulting crystalline material is collected by filtration and washed with water. After drying and recrystallizing from ethanol, 4-phenoxy-5-sulfamyl-N,N-dibenzyl-anthranilic acid is obtained as a semi-hydrate with a melting point of 168°–169°C (dec.).

EXAMPLE 21

Ethyl 4-(4'-chlorophenoxy)-5-sulfamyl-N-benzyl-anthranilate a. Ethyl 2-chloro-4-(4'-chlorophenoxy)-5-sulfamyl-benzoate A solution of ethyl 2-chloro-4-fluoro-5-sulfamyl-benzoate (2.85 g), 4-chlorophenol (1.5 g), and sodium (0.25 g) in ethanol (25 ml) is refluxed for 20 hours. The mixture is evaporated in vacuo, and the residue is triturated with water. The resulting crystalline material is washed with water and with cold 50 percent ethanol. After drying and recrystallizing from 50 percent ethanol, ethyl 2-chloro-4-(4'-chlorophenoxy)-5-sulfamyl-benzoate is obtained with a melting point of 142°–143°C.

b. Ethyl 4-(4'-chlorophenoxy)-5-sulfamyl-N-benzyl-anthranilate

A mixture of ethyl 2-chloro-4-(4'-chlorophenoxy)-5-sulfamyl-benzoate (2.0 g) and benzylamine (6.0 ml) is heated on a steam bath for 2 hours. The mixture is then poured into cold 4N acetic acid (50 ml), and the resulting precipitate is washed with water. After drying and recrystallizing from ethanol, ethyl 4-(4'-chlorophenoxy)-5-sulfamyl-N-benzyl-anthranilate is obtained with a melting point of 202°–203°C.

EXAMPLE 22

4-(4'-Chlorophenoxy)-5-sulfamyl-N-benzyl-anthranilic acid

A mixture of ethyl 4-(4'-chlorophenoxy)-5-sulfamyl-N-benzyl-anthranilate (2.0 g) and 2N sodium hydroxide is heated on a steam bath for 1 hour. The solution is cooled and acidified with concentrated hydrochloric acid (4 ml). The resulting precipitate is collected by filtration, washed with water and with cold ethanol. After drying and recrystallizing from a mixture of ethanol and methylcellosolve, 4-(4'-chlorophenoxy)-5-sulfamyl-N-benzyl-anthranilic acid is obtained with a melting point of 262°–263°C (dec.).

EXAMPLES 23 –24

By following the procedure of Example 21, step a, and replacing the 4-chlorophenol by 2-fluorophenol (1.25 g) and β-naphthol (1.6 g), respectively, the ethyl 2-chloro-4-(2'-fluorophenoxy)-5-sulfamyl-benzoate and the ethyl 2-chloro-4-(β-naphthoxy)-5-sulfamyl-benzoate with a melting point of 139°–140°C and 172°–173°C, respectively, are obtained which by following the procedure of step b are converted into ethyl 4-(2'-fluorophenoxy)-5-sulfamyl-N-benzyl anthranilate and ethyl 4-(β-naphthoxy)-5-sulfamyl-N-benzyl-anthranilate with a melting point of 132°–134°C and 189°–190°C, respectively.

EXAMPLES 25 – 26

By replacing, in Example 22, the ethyl 4-(4'-chlorophenoxy)-5-sulfamyl-N-benzyl-anthranilate by the ethyl esters of Examples 23 and 24, the 4-(2'-fluorophenoxy)-5-sulfamyl-N-benzyl-anthranilic acid and the 4-(β-naphthoxy)-5-sulfamyl-N-benzyl-anthranilic acid, respectively, are obtained with the melting points of 248°–248.5°C and 255°–257°c.

EXAMPLE 27

4-(3'-Pyridyloxy)-5-sulfamyl-N-benzyl-anthranilic acid a. 2-Chloro-4-(3'-pyridyloxy)-5-sulfamyl-benzoic acid By replacing the 4-chlorophenol of Example 21, step a, by 3-hydroxypyridine (1.2 g) and saponifying the intermediate ethyl 2-chloro-4-(3'-pyridyloxy)-5-sulfamyl-benzoate, 2-chloro-4-(3'-pyridyloxy) 5-sulfamyl-benzoic acid hydrochloride is obtained with a melting point of 269°–270°C (dec.).

b. 4-(3'-Pyridyloxy)-5-sulfamyl-N-benzyl-anthranilic acid

By replacing, in Example 21, step b, the ethyl 2-chloro-4-(4'-chlorophenoxy)-5-sulfamyl-benzoate by 2-chloro-4-(3'-pyridyloxy)-5-sulfamyl-benzoic acid, 4-(3--pyridyloxy)-5-sulfamyl-N-benzyl-anthranilic acid hydrate is obtained with a melting point of 245°–246°C (dec.).

EXAMPLES 28 – 30

Following the procedure of Example 1, steps a and b, and replacing the phenol by 3-methoxyphenol, 3-methylphenol, and 3-trifluoromethylphenol, respectively, the corresponding 4-(3'-methoxyphenoxy)-, 4-(3'-methylphenoxy)-, and 4-(3'-trifluoromethylphenoxy)-5-sulfamyl-N-benzyl-anthranilic acid are obtained with melting points of 214.5°–216°C, 229.5°–231°C, and 226°–227°C (dec.).

EXAMPLE 31

4-Phenoxy-5-sulfamyl-anthranilic acid

A suspension of 4-phenoxy-5-sulfamyl-N-benzyl-anthranilic acid (4 g) in 80 percent ethanol (100 ml) and concentrated hydrochloric acid (0.2 ml) is hydrogenated at 1.1 atmospheres in the presence of palladium (10 percent) on charcoal (0.5 g). The theoretical amount of hydrogen is absorbed in about 40 minutes. The catalyst is removed by filtration, and the filtrate is evaporated in vacuo. The resulting crystalline material is triturated with 4N acetic acid (10 ml), filtered off, and washed with water. After drying, 4-phenoxy-5-sulfamyl-anthranilic acid is obtained with a melting point of 233°–234°C. The melting point is unchanged after recrystallization from aqueous ethanol.

EXAMPLE 32

4-Phenoxy-5-sulfamyl-N-benzyl-anthranilic acid A mixture of 4-phenoxy-5-sulfamyl-anthranilic acid 0.31 g), benzaldehyde (0.15 g), and acetic acid (4 ml) is hydrogenated at 1.1 atmospheres in the presence of $PtO_2$ (0.01 g). The theoretical amount of hydrogen is absorbed in about 4 hours. Water (4ml) is added, and the mixture is left overnight. The resulting precipitate is filtered off and washed with water. The acid is dissolved in 1N sodium hydroxide (5 ml), and the catalyst is removed by filtration. The filtrate is acidified with acetic acid (1 ml), and the resulting precipitate is filtered and washed with water. After drying and recrystallizing from ethanol, 4-phenoxy-5-sulfamyl-N-benzyl-anthranilic acid is obtained with a melting point of 241°–242.5°C (dec.). The material is identical (IR analysis) with the material prepared as in Example 1 b.

EXAMPLE 33

4-Phenoxy-5-sulfamyl-N-benzyl-anthranilic acid

A solution of 4-phenoxy-5-sulfamyl-anthranilic acid (5.0 g) and benzyl bromide (5.0 ml) in methyl-cellosolve (50 ml) is heated on a steam bath for 18 hours and is thereafter evaporated in vacuo. The semi-solid residue is washed with water and triturated with ethanol (25 ml). The resulting crystalline material is collected by filtration and washed with water. After drying and recrystallizing from ethanol, 4-phenoxy-5-sulfamyl-N-benzyl-anthranilic acid is obtained with a melting point of 240°–242°C (dec.). The material is identical (IR analysis) with the material as prepared in Example 1 b.

EXAMPLE 34

4-(2'-Methoxy-ethoxy)-5-sulfamyl-N-benzyl-anthranilic acid a. 2-Chloro-4-(2'-methoxy-ethoxy)-5-sulfamyl-benzoic acid A mixture of 2-chloro-4-fluoro-5-sulfamyl-benzoic acid (2.5 g), sodium (0.5 g), and ethylene glycol monomethyl ether (methyl-cellosolve) (10 ml) is refluxed for 20 hours. The mixture is evaporated in vacuo, and the residue is treated with 1N hydrochloric acid (25 ml). The precipitated oil is crystallized from aqueous acetonitrile, filtered off, and washed with water. After drying and recrystallizing from acetonitrile, 2-chloro-4-(2'-methoxy-ethoxy)-5-sulfamyl-benzoic acid is obtained with a melting point of 216°–218°C.

b. 4-(2'-Methoxy-ethoxy)-5-sulfamyl-N-benzyl-anthranilic acid

A solution of 2-chloro-4-(2'-methoxy-ethoxy)-5-sulfamyl-benzoic acid (0.8 g) and benzylamine (4.0 ml) in methyl-cellosolve (8 ml) is refluxed for 18 hours. The solution is evaporated in vacuo, and the residue is treated with 2N hydrochloric acid (20 ml). The resulting precipitate is filtered off and washed with water. After drying and recrystallizing from ethanol, 4-(2'-methoxy-ethoxy)-5-sulfamyl-N-benzyl-anthranilic acid is obtained with a melting point of 213°–214°C (dec.).

EXAMPLE 35

4-n-Butyloxy-5-sulfamyl-N-benzyl-anthranilic acid a. 4-n-Butyloxy-2-chloro-5-sulfamyl-benzoic acid A mixture of 2-chloro-4-fluoro-5-sulfamyl-benzoic acid (2.55 g) and sodium (0.7 g) dissolved in n-butanol (20 ml) is stirred at 130°C for 20 hours. The mixture is cooled and diluted with petroleum ether (boiling point 50°–70°C, 20 ml). The resulting precipitate is collected by filtration and washed with petroleum ether. The crude sodium 4-n-butyloxy-2-chloro-5-sulfamyl-benzoate is dissolved in water (20 ml), and the solution is acidified with concentrated hydrochloric acid (3 ml). The resulting precipitate is collected by filtration and washed with water. After drying and recrystallizing from 50 percent ethanol, 4-n-butyloxy-2-chloro-5-sulfamyl-benzoic acid hydrate is obtained with a melting point of 175°–176°C.

b. 4-n-Butyloxy-5-sulfamyl-N-benzyl-anthranilic acid

By replacing, in Example 1 b, the 2-chloro-4-phenoxy-5-sulfamyl-benzoic acid by 4-n-butyloxy-2-chloro-5-sulfamyl-benzoic acid hydrate, 4-n-butyloxy-5-sulfamyl-N-benzyl-anthranilic acid is obtained with a melting point of 242°–243°C (dec.).

EXAMPLE 36

4-n-Butyloxy-5-sulfamyl-N-[furyl-(2)-methyl]-anthranilic acid

By replacing, in Example 16, the 2-chloro-4-phenoxy-5-sulfamyl-benzoic acid by 2-chloro-4-n- butyloxy-5-sulfamyl-benzoic acid, 4-n-butyloxy-5-sulfamyl-N-[furyl-(2)-methyl]-anthranilic acid is obtained with a melting point of 222°–222.5°C (dec.).

EXAMPLE 37

4-Phenylthio-5-sulfamyl-N-n-butyl-anthranilic acid

By replacing, in Example 13, the 2-chloro-4-phenoxy-5-sulfamyl-benzoic acid by 2-chloro-4-phenylthio-5-sulfamyl-benzoic acid, 4-phenylthio-5-sulfamyl-N-n-butyl-anthranilic acid is obtained with a melting point of 246°–247°C (dec.).

EXAMPLE 38

4-Phenylthio-5-sulfamyl-N-benzyl-anthranilic acid a. 2-Chloro-4-phenylthio-5-sulfamyl-benzoic acid A solution of 2-chloro-4-fluoro-5-sulfamyl-benzoic acid (12.7 g), thiophenol (8 g), and sodium hydrogen carbonate (25 g) in water (100 ml) is heated on a steam bath for 5 hours. After cooling, the mixture is carefully acidified with concentrated hydrochloric acid (30 ml). The resulting precipitate is filtered off and washed with water. After drying and recrystallizing from aqueous acetonitrile, 2-chloro-4-phenylthio-5-sulfamyl-benzoic acid with a melting point of 257°–260°C (dec.) is obtained.

From the mother liquors, further crop with a melting point of 254°–256°C (dec.) is obtained. Recrystallization from aqueous ethanol raises the melting point to 258.5°–260°C (dec.).

b. 4-Phenylthio-5-sulfamyl-N-benzyl-anthranilic acid

A mixture of 2-chloro-4-phenylthio-5-sulfamyl-benzoic acid (6 g) and benzylamine (20 ml) is heated to 140°C for 4 hours. The mixture is poured into cold 4N acetic acid (100 ml), and the resulting precipitate is filtered off and washed with water. After drying and recrystallizing from ethanol, crude 4-phenylthio-5-sulfamyl-N-benzyl-anthranilic acid is obtained with a melting point of 245°–247°C (dec.).

EXAMPLE 39

4-Phenylthio-5-sulfamyl-N-benzyl-anthranilic acid

A mixture of 4-chloro-5-sulfamyl-N-benzyl-anthranilic acid (1.8 g), thiophenol (3 ml), sodium hydrogen carbonate (5 g), and methyl-cellosolve (10 ml) is refluxed for 72 hours while stirring. The mixture is diluted with water (25 ml) and twice extracted with diethyl ether. The aqueous solution is carefully acidified with concentrated hydrochloric acid, and the resulting precipitate is washed with water, ethanol, and diethyl ether. After drying and recrystallizing from ethanol, 4-phenylthio-5-sulfamyl-N-benzyl-anthranilic acid is obtained with a melting point of 245°–246°C (dec.). The material is identical (IR analysis) with material prepared as in Example 38 b.

EXAMPLE 40

4-Phenylthio-5-sulfamyl-N-[furyl-(2)-methyl]-anthranilic acid

A solution of 4-chloro-5-sulfamyl-N-[furyl-(2)-methyl]-anthranilic acid (3.3 g), thiophenol (6 ml), and sodium hydrogen carbonate (10 g) in water (20 ml) and methyl-cellosolve (20 ml) is refluxed for 48 hours while stirring. The mixture is diluted with water (100 ml) and, after cooling, acidified to pH 4 with acetic acid. The resulting precipitate is filtered off and washed with water, ethanol, and diethyl ether. After drying and recrystallizing from methyl-cellosolve, crude 4-phenylthio-5-sulfamyl-N-[furyl-(2)-methyl]-anthranilic acid is obtained with a melting point of 245°–246°C (dec.).

EXAMPLE 41

4-Phenylthio-5-sulfamyl-N-[pyridyl-(3)-methyl]-anthranilic acid

A solution of 2-chloro-4-phenylthio-5-sulfamyl-benzoic acid (2 g) and 3-picolylamine (8 ml) in methyl-cellosolve (8 ml) is refluxed for 18 hours. The mixture is evaporated in vacuo, and the residue is crystallized from 4N acetic acid (25 ml). The resulting material is filtered off and washed with water. After drying and recrystallizing from methyl-cellosolve, 4-phenylthio-5-sulfamyl-N-[pyridyl-(3)-methyl]-anthranilic acid is obtained with a melting point of 260°–261.5°C (dec.).

EXAMPLE 42

4-Phenylthio-5-sulfamyl-N,N-di-n-butyl-anthranilic acid

A solution of 2-chloro-4-phenylthio-5-sulfamyl-benzoic acid (2.0 g) and di-n-butylamine (8.0 ml) in methyl-cellosolve (10 ml) is refluxed for 40 hours. The solution is evaporated in vacuo, and the residue is treated with 4N acetic acid (10 ml). The resulting crystalline material is filtered off and washed with water. After drying and recrystallizing twice from ethanol, 4-phenylthio-5-sulfamyl-N,N-di-n-butyl-anthranilic acid is obtained with a melting point of 205°–206°C (dec.).

EXAMPLE 43

4-Phenylthio-5-sulfamyl-N,N-dibenzyl-anthranilic acid

A mixture of 4-fluoro-5-sulfamyl-N,N-dibenzyl-anthranilic acid (1.25 g), thiophenol (1.0 ml), sodium hydrogen carbonate (3.0 g), and water (15 ml) is heated on a steam bath for 24 hours. The resulting solution is filtered hot in the presence of decolourizing carbon, and the clear filtrate is acidified with concentrated hydrochloric acid (4 ml). The resulting precipitate is collected by filtration and washed with water. After drying, 4-phenylthio-5-sulfamyl-N,N-dibenzyl-anthranilic acid hydrate with a melting point of about 185°C (dec.). (after loss of water of crystallization at 115°C) is obtained. Recrystallization from ethanol raises the melting point to 189–190°C (dec.) (water lost at 115°C).

EXAMPLE 44

4-(4'-Acetaminophenylthio)-5-sulfamyl-N-benzyl-anthranilic acid a. Ethyl 4-(4'-acetaminophenylthio)-2-chloro-5-sulfamyl-benzoate By replacing, in Example 21 a, the 4-chlorophenol by 4-acetaminothiophenol (1.9 g), 4-(4'-acetaminophenylthio)-2-chloro-5-sulfamyl-benzoate is obtained with a melting point of 234°–235°C.

b. Ethyl 4-(4'-acetaminophenylthio)-5-sulfamyl-N-benzyl-anthranilate

By replacing, in Example 21 b, the ethyl 2-chloro-4-(4'-chlorophenoxy)-5-sulfamyl-benzoate by ethyl 4-(4'-acetaminophenylthio)-2-chloro-5-sulfamyl-benzoate (2.0 g), ethyl 4-(4'-acetaminophenylthio)-5-sulfamyl-anthranilate is obtained with a melting point of 237°–238°C.

c. 4-(4'-Acetaminophenylthio)-5-sulfamyl-N-benzyl-anthranilic acid

A solution of ethyl 4-(4'-acetaminophenylthio)-5-sulfamyl-N-benzyl-anthranilate (1.5 g) in a mixture of 1N sodium hydroxide (7.5 ml) and water (12 ml) is stirred at room temperature for 20 hours. The solution is acidified with acetic acid (3.0 ml), and the resulting precipitate is collected by filtration and washed with water. After drying, 4-(4'-acetaminophenylthio)-5-sulfamyl-N-benzyl-anthranilic acid with a melting point of 250°C (dec.) is obtained. Recrystallization from methyl-cellosolve raises the melting point to 266°–267°C (dec.).

EXAMPLE 45

4-(3'-Methylphenylthio)-5-sulfamyl-N-benzyl-anthranilic acid a. 2-Chloro-4-(3'-methylphenylthio)-5-sulfamyl-benzoic acid By replacing, in Example 38 a, the thiophenol by 3-methylthiophenol, 2-chloro-4-(3'-methylphenylthio)-5-sulfamyl-benzoic acid with a melting point of 230°–231°C is obtained.

b. 4-(3'-Methylphenylthio)-5-sulfamyl-N-benzyl-anthranilic acid

By replacing, in Example 38 b, the 2-chloro-4-phenylthio-5-sulfamyl-benzoic acid by 2-chloro-4-(3'-methylphenylthio)-5-sulfamyl-N-benzyl-anthranilic acid with a melting point of 248°–250°C (dec.) is obtained.

EXAMPLE 46

4-n-Butylthio-5-sulfamyl-N-benzyl-anthranilic acid a. Ethyl 4-n-butylthio-2-chloro-5-sulfamyl-benzoate By replacing, in Example 21 a, the 4-chlorophenol by n-butylmercaptane (1.25 ml) and decreasing the reaction time to two hours, ethyl 4-n-butylthio-2-chloro-5-sulfamyl-benzoate is obtained with a melting point of 99°–101°C.

b. Ethyl 4-n-butylthio-5-sulfamyl-N-benzyl-anthranilate

By replacing, in Example 21 b, the ethyl 2-chloro-4-(4'-chlorophenoxy)-5-sulfamyl-benzoate by ethyl 4-n-butylthio-2-chloro-5-sulfamyl-benzoate (2.0 g), ethyl 4-n-butylthio-5-sulfamyl-N-anthranilate is obtained with a melting point of 180–182°C.

c. 4-n-Butylthio-5-sulfamyl-N-benzyl-anthranilic acid

By replacing, in Example 22, the ethyl 4-(4'-chlorophenoxy)-5-sulfamyl-N-benzyl-anthranilate by ethyl 4-n-butylthio-5-sulfamyl-N-benzyl-anthranilate (2.0 g), 4-n-butylthio-5-sulfamyl-N-benzyl-anthranilic acid is obtained with a melting point of 236–237°C.

EXAMPLE 47

4-(2'-Phenylethylthio)-5-sulfamyl-N-benzyl-anthranilic acid a. 2-Chloro-4-(2'-phenylethylthio)-5-sulfamyl-benzoic acid By replacing, in Example 38 a, the thiophenol by β-phenylethylmercaptane and extending the reaction time to 20 hours, 2-chloro-4-(2'-phenylethylthio)-5-sulfamyl-benzoic acid is obtained with a melting point of 201°–202°C.

b. 4-(2'-Phenylethylthio)-5-sulfamyl-N-benzyl-anthranilic acid

By replacing, in Example 38 b, the 2-chloro-4-phenylthio-5-sulfamyl-benzoic acid by 2-chloro-4-(2'-phenylethylthio)-5-sulfamyl-benzoic acid, 4-(2'-phenylethylthio)-5-sulfamyl-N-benzyl-anthranilic acid is obtained with a melting point of 234°–246°C (dec.).

EXAMPLE 48

4-Phenylthio-5-sulfamyl-anthranilic acid a. 4-Phenylthio-5-sulfamyl-N-acetyl-anthranilic acid A solution of 4-fluoro-5-sulfamyl-N-acetyl anthranilic acid (2.0 g), thiophenol (5.0 ml), and sodium hydrogen carbonate (8.0 g) in water (25 ml) is heated on a steam bath for 6 hours. After cooling, the mixture is extracted twice with diethyl ether, and the aqueous solution is carefully acidified with concentrated hydrochloric acid. The resulting precipitate is filtered off and washed with water. After drying and recrystallizing from ethanol, 4-phenylthio-5-sulfamyl-N-acetyl anthranilic acid is obtained with a melting point of 222°C (dec.).

b. 4-Phenylthio-5-sulfamyl-anthranilic acid

A mixture of 4-phenylthio-5-sulfamyl-N-acetyl-anthranilic acid (1.0 g), 4N hydrochloric acid (15 ml), and ethanol (15 ml) is refluxed for 5 hours. The solvents are removed in vacuo. The residue is treated with water (15 ml) and an excess of solid sodium acetate. The resulting precipitate is filtered off and washed with water. After drying and recrystallizing from ethanol, 4-phenylthio-5-sulfamyl-anthranilic acid is obtained with a melting point of 263°–264°C (dec.).

EXAMPLE 49

4-Phenylsulfinyl-5-sulfamyl-N-benzyl-anthranilic acid

To a solution of 4-phenylthio-5-sulfamyl-N-benzyl-anthranilic acid (1.5 g) in acetone (100 ml) is added 30 percent $H_2O_2$ (0.6 ml), and the mixture is stirred at room temperature for 20 hours. The solvent is removed in vacuo, and the resulting crystalline material is triturated with diethyl ether, filtered off, and washed with diethyl ether. After drying, 4-phenylsulfinyl-5-sulfamyl-N-benzyl-anthranilic acid is obtained.

EXAMPLE 50

4-Phenylsulfonyl-5-sulfamyl-N-benzyl-anthranilic acid

A mixture of 4-phenylthio-5-sulfamyl-N-benzyl-anthranilic acid (0.5 g), 30 percent $H_2O_2$ (2.5 ml), and acetic acid (5 ml) is stirred at room temperature for 20 hours. The mixture is diluted with water (10 ml), and the precipitate is filtered off and washed with water. After drying and recrystallizing from methyl-cellosolve, 4-phenylsulfonyl-5-sulfamyl-N-benzyl-anthranilic acid is obtained with a melting point of 290°–291°C (dec.).

EXAMPLE 51

4-Phenoxy-5-phenylsulfamyl-N-benzyl-anthranilic acid a. 2-Chloro-4-fluoro-5-phenylsulfamyl-benzoic acid A mixture of 2-chloro-4-fluoro-5-chlorosulfonyl-benzoic acid (5 g), aniline (5 ml), sodium hydrogen carbonate (5 g), and 50 percent ethanol (25 ml) is stirred at room temperature for 20 hours. The solvents are removed in vacuo, and the residue is diluted with water (50 ml) and extracted twice with diethyl ether. The aqueous solution is acidified with concentrated hydrochloric acid (5 ml). The resulting precipitate is filtered off and washed with water. After drying and recrystallizing from 50 percent ethanol, 2-chloro-4-fluoro-5-phenylsulfamyl-benzoic acid is obtained with a melting point of 204.5°–205°–5°C.

b. 2-Chloro-4-phenoxy-5-phenylsulfamyl-benzoic acid

A mixture of 2-chloro-4-fluoro-5-phenylsulfamyl-benzoic acid (4 g), phenol (16 g), and potassium hydroxide (3.5 g) is heated while stirring to 150°–160°C for 3 hours. The mixture is diluted with water (25 ml) and extracted twice with diethyl ether. The aqueous solution is acidified with concentrated hydrochloric acid (5 ml), and the resulting precipitate is filtered off and washed with water and with cold 50 percent ethanol. After drying and recrystallizing from aqueous ethanol, 2-chloro-4-phenoxy-5-phenylsulfamyl-benzoic acid is obtained with a melting point of 233°–234°C.

c. 4-Phenoxy-5-phenylsulfamyl-N-benzyl-anthranilic acid

A solution of 2-chloro-4-phenoxy-5-phenylsulfamyl-benzoic acid (2 g) and benzylamine (6 ml) in methyl-cellosolve (6 ml) is refluxed for 16 hours. The mixture is poured into 4N acetic acid (25 ml). The resulting precipitate is filtered off and washed with water. After drying and recrystallizing from ethanol, 4-phenoxy-5-phenylsulfamyl-N-benzyl-anthranilic acid is obtained with a melting point of 235.5°–236°C.

EXAMPLE 52

4-Phenylthio-5-(4'-methoxyphenylsulfamyl)-N-benzyl-anthranilic acid a. 2-Chloro-4-fluoro-5-(4'-methoxyphenylsulfamyl)-benzoic acid A mixture of 2-chloro-4-fluoro-5-chlorosulfonyl-benzoic acid (5 g), p-anisidine (5 g), sodium hydrogen carbonate (5 g), and 50 percent ethanol (25 ml) is stirred at room temperature for 20 hours. The solvents are removed in vacuo. The residue is diluted with water (50 ml) and extracted twice with diethyl ether. The aqueous solution is acidified with concentrated hydrochloric acid (5 ml). The resulting precipitate is filtered off and washed with water. After drying and recrystallizing from aqueous ethanol, 2-chloro-4-fluoro-5-(4'-methoxyphenylsulfamyl)-benzoic acid is obtained with a melting point of 190°–191°C.

b. 2-Chloro-4-phenylthio-5-(4'-methoxyphenyl)-benzoic acid

A solution of 2-chloro-4-fluoro-5-(4'-methoxyphenylsulfamyl)-benzoic acid (4.75 g), thiophenol (2 ml), and sodium hydrogen carbonate (10 g) in water (25 ml) is heated on a steam bath for 4 hours. After cooling, the solution is acidified with concentrated hydrochloric acid. The resulting precipitate is filtered off and washed with water and a minor amount of cold 50 percent ethanol. After drying and recrystallizing from ethanol, 2-chloro-4-phenylthio-5-(4'-methoxyphenyl)-benzoic acid is obtained with a melting point of 218°–219°C.

c. 4-Phenylthio-5-(4'-methoxyphenylsulfamyl)-N-benzyl-anthranilic acid

A mixture of 2-chloro-4-phenylthio-5-(4'-methoxyphenylsulfamyl)-benzoic acid (1 g) and benzylamine (4 ml) is heated to 140°C for 4 hours. The mixture is poured into 4N acetic acid (25 ml). The resulting precipitate is filtered off and washed with water. After drying and recrystallizing from aqueous ethanol, 4-phenylthio-5-(4'-methoxyphenylsulfamyl)-N-benzyl-anthranilic acid is obtained with a melting point of 200°–201°C (dec.).

EXAMPLE 53

4-Phenoxy-5-(N-acetylsulfamyl)-N-benzyl-anthranilic acid

To a suspension of 4-phenoxy-5-sulfamyl-N-benzyl-anthranilic acid (1.0 ml) in water (25 ml), 2N lithium hydroxide is added through an automatic end-point titrator until pH = 11.0. To the resulting solution, acetic acid anhydride (1.0 ml) is added in portions, keeping the pH at 11.0 by the addition of 2N lithium hydroxide through the titrator. When the base consumption ceases, the solution is acidifed with concentrated hydrochloric acid (2.0 ml). The resulting precipitate is collected by filtration and washed with water. After drying and recrystallizing twice from a mixture of ethanol and methyl-cellosolve, 4-phenoxy-5-(N-acetylsulfamyl)-N-benzyl-anthranilic acid is obtained with a melting point of 250°–250.5°C (dec.).

EXAMPLE 54

4-Phenoxy-5-N-[(N'-n-butylcarbamyl)-sulfamyl]-N-benzyl anthranilic acid

To a solution of 4-phenoxy-5-sulfamyl-N-benzyl-anthranilic acid (1.33 g) in a mixture of 1N lithium hydroxide (6.7 ml) and acetone (6.7 ml), a solution of n-butylisocyanate (0.38 ml) in acetone (0.4 ml) is added dropwise while stirring at 10°C. The resulting solution is stirred at room temperature for a further 24 hours. Water (10 ml) is added, and the mixture is extracted with diethyl ether. The aqueous phase is separated and acidified with 4N hydrochloric acid (2 ml). The resulting precipitate is collected by filtration and washed with water. After drying and recrystallizing twice from ethyl acetate, 4-phenoxy-5-[N-(N'-n-butylcarbamyl)-sulfamyl]-N-benzyl-anthranilic acid is obtained with a melting point of 217°–219°C (dec.).

EXAMPLE 55

Methyl 4-phenoxy-5-sulfamyl-N-[furyl-(2)-methyl]-anthranilate a. Methyl 2-chloro-4-phenoxy-5-sulfamyl-benzoate A solution of 2-chloro-4-phenoxy-5-sulfamyl-benzoic acid (10 g) in methanol (200 ml) is saturated with hydrogen chloride and left overnight. The solution is evaporated in vacuo, and the crystalline residue is washed with saturated sodium hydrogen carbonate solution (25 ml) and collected by filtration. After drying and recrystallizing from aqueous methanol, methyl-2-chloro-4-phenoxy-5-sulfamyl-benzoate semihydrate is obtained with a melting point of 92°–95°C.

b. Methyl 4-phenoxy-5-sulfamyl-N-[furyl-(2)-methyl]-anthranilate

A solution of methyl 2-chloro-4-phenoxy-5-sulfamyl-benzoate (2.0 g) in furfurylamine (8.0 ml) is stirred at 100°C for 3.5 hours. The mixture is poured into cold 4N acetic acid (40 ml). The initially precipitated oil crystallizes on standing overnight. The crystalline material is collected by filtration and washed with water. After drying and recrystallizing twice from methanol and from ethylacetate, methyl 4-phenoxy-5-sulfamyl-N-[furyl-(2)-methyl]-anthranilate is obtained with a melting point of 137.5°–139°C.

EXAMPLE 56

Methyl 4-phenylthio-5-sulfamyl-N-[furyl-(2-methyl]-anthranilate a. Methyl 2-chloro-4-phenylthio-5-sulfamyl-benzoate By replacing, in Example 55a, the 2-chloro-4-phenoxy-5-sulfamyl-benzoic acid by 2-chloro-4-phenylthio-5-sulfamyl-benzoic acid, methyl 2-chloro-4-phenylthio-5-sulfamyl-benzoate is obtained with a melting point of 159°–160.5°C.

b. Methyl 4-phenylthio-5-sulfamyl-N-[furyl-(2)-methyl]-anthranilate

By replacing, in Example 55 b, the methyl 2-chloro-4-phenoxy-5-sulfamyl-benzoate by methyl 2-chloro-4-phenylthio-5-sulfamyl-benzoate, methyl 4-phenylthio-5-sulfamyl-N-[furyl-(2)-methyl]-anthranilate is obtained with a melting point of 187°–189°C.

EXAMPLE 57

Cyanomethyl 4-phenoxy-5-sulfamyl-N-benzyl-anthranilate

A solution of 4-phenoxy-5-sulfamyl-N-benzyl-anthranilic acid (3.6 g), chloroacetonitrile (1.0 g), and triethylamine (0.99 g) in dry acetone (30 ml) is refluxed for 20 hours and then evaporated in vacuo. The residue is triturated with 1N sodium hydrogen carbonate solution (20 ml), and the undissolved material is extracted with ethyl acetate (about 50 ml). The organic layer is washed with water, dried (MgSO₄), and evaporated in vacuo. The residue is triturated with cold 50 percent isopropanol (20 ml). The resulting crystalline material is collected by filtration and washed with cold 50 percent isopropanol. After drying and recrystallizing from 50 percent isopropanol, cyanomethyl 4-phenoxy-5-sulfamyl-N-benzyl-anthranilate is obtained with a melting point of 132°–134°C.

What we claim is:

1. A compound of the formula

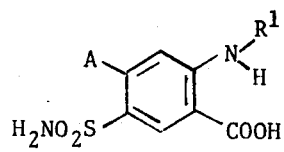

a pharmaceutically acceptable salt thereof or an ester thereof with cyanomethanol, benzyl alcohol, or a lower alkanol, wherein, A is $R^2O$- or $R^2$-S-, $R^1$ is benzyl, furylmethyl, thienylmethyl or pyridylmethyl, and $R^2$ is phenyl or pyridyl; provided that at least one of $R^1$ or $R^2$ is or contains a heterocyclic radical.

2. 4-Phenoxy-5-sulfamyl-N-[furyl-(2)-methyl]-anthranilic acid, a pharmaceutically acceptable salt thereof or an ester thereof with cyanomethanol, benzyl alcohol, or a lower alkanol.

3. 4-Phenoxy-5-sulfamyl-N-[thienyl-(2)-methyl]-anthranilic acid, a pharmaceutically acceptable salt thereof or an ester thereof with cyanomethanol, benzyl alcohol, or a lower alkanol.

4. 4-Phenylthio-5-sulfamyl-N-[furyl-(2)-methyl]-anthranilic acid, a pharmaceutically acceptable salt thereof or an ester thereof with cyanomethanol, benzyl alcohol, or a lower alkanol.

* * * * *